United States Patent [19]

Marulic et al.

[11] 3,868,127
[45] Feb. 25, 1975

[54] ENGAGED KINGPIN DETECTOR ASSEMBLY FOR FIFTH WHEEL PLATE

[75] Inventors: Walter J. Marulic, Gary, Ind.; Ray L. Ferris, Thornton, Ill.

[73] Assignee: Pullman Incorporated, Chicago, Ill.

[22] Filed: July 26, 1974

[21] Appl. No.: 492,296

[52] U.S. Cl. ................................ 280/434, 403/27
[51] Int. Cl. ............................................ B62d 53/08
[58] Field of Search ................. 280/434; 403/27; 105/368 S

[56] References Cited
UNITED STATES PATENTS

| | | | |
|---|---|---|---|
| 2,387,625 | 10/1945 | Walther | 280/435 X |
| 3,268,250 | 8/1966 | Ferris | 280/434 X |
| 3,484,124 | 12/1969 | Wille | 280/434 X |
| 3,513,804 | 5/1970 | Yeates et al. | 105/368 S X |
| 3,536,282 | 10/1970 | Ferris | 105/368 S X |
| 3,632,145 | 1/1972 | Davis | 403/27 X |
| 3,647,248 | 3/1972 | Ferris et al. | 280/434 X |
| 3,751,079 | 8/1973 | Marulic et al. | 403/27 |
| 3,759,546 | 9/1973 | Slaven | 280/434 |

*Primary Examiner*—Leo Friaglia
*Attorney, Agent, or Firm*—Hilmond O. Vogel

[57] ABSTRACT

A fifth wheel plate for a trailer hitch or the like includes a locking mechanism which is adapted to lock a kingpin receiving jaw in a closed position. The locking mechanism includes an indicating member in an unlocked position projecting outwardly with respect to the fifth wheel plate so as to be readily visible. The indicating member also includes a slidable locking member which engages the kingpin jaw in the closed position for securing the same with the kingpin locked in place. An engaged kingpin detector assembly is provided which upon proper engagement of a kingpin in the fifth wheel plate permits engagement of the locking member with the fifth wheel plate. If the kingpin is not properly engaged, the detector assembly precludes engagement of the locking member.

5 Claims, 4 Drawing Figures

PATENTED FEB 25 1975 3,868,127

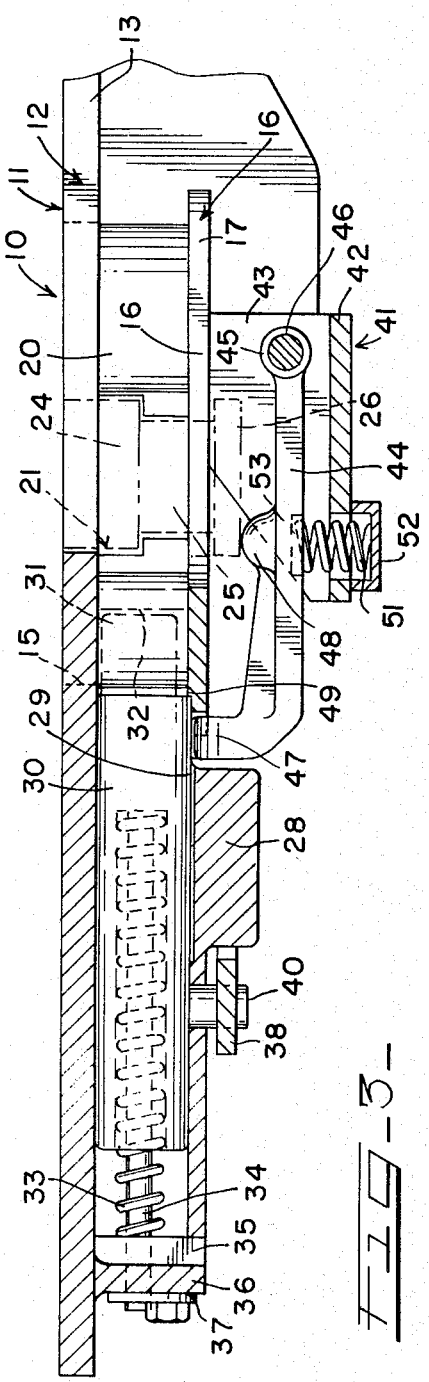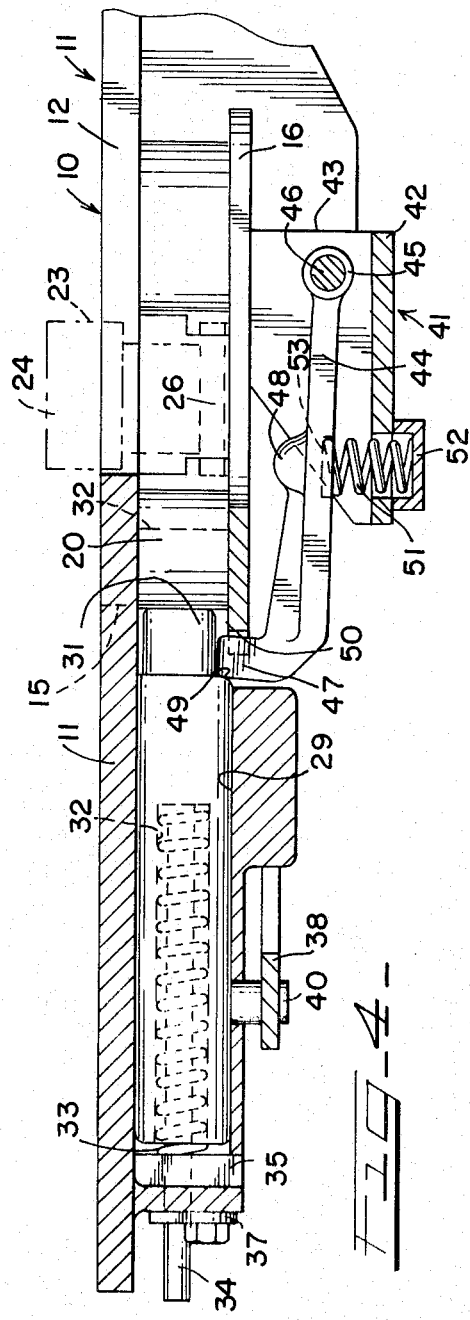

ENGAGED KINGPIN DETECTOR ASSEMBLY FOR FIFTH WHEEL PLATE

BACKGROUND OF THE INVENTION

1. Field of the Invention:

This invention concerns trailer hitches of the type that are used for connecting over-the-highway trailers to railway cars during trailer on flat car operations.

2. Description of the Prior Art:

The prior art is best illustrated in U.S. Pat. Nos. 2,387,625; 3,513,804 and 3,647,248 and includes devices for indicating to the operator whether or not a trailer kingpin is engaged within the locking jaw of a fifth wheel plate. These devices, however, do not indicate to the operator if there is an improper engagement between the kingpin and the locking jaw of the fifth wheel plate from a vertical alignment standpoint such as might occur when the trailer is loaded by means of a crane onto the flat car by vertically registering the kingpin with the lock opening of a locking jaw. The present invention has for its primary object the provision of a kingpin detector assembly which indicates when a kingpin is improperly engaged with the locking jaw by reason of vertical misalignment.

SUMMARY OF THE INVENTION

The fifth wheel plate of the present invention is particularly adapted for use with trailer hitches of the type supported on railway flat cars for securing over-the-highway trailers in trailer on flat car operation. The present fifth wheel plate includes a rotatable coupler jaw which captures a kingpin as a trailer is loaded onto the railway flat car by means of a crane and whereupon the kingpin and trailer are lowered vertically so that the kingpin registers with the coupler jaw and is engaged by the same into a closed and locked position. Locking means for locking the rotatable coupler jaw in the locked position with the kingpin in place includes a slidable plunger which in the locked position engages an aperture in the coupler jaw to prevent turning movement of the coupler jaw to an open position. This type of locking mechanism is well-disclosed in U.S. Pat. Nos. 3,268,250; Aug. 23, 1966, and 3,647,248; Mar. 7, 1972. In these patents the locking plunger also includes an indicator rod which during the open position of the coupler jaw projects from the fifth wheel plate so that said projection is visible to indicate to the operator that the coupler jaw is in an unlocked position. When the coupler jaw is in a locked position it is engaged by the locking plunger, the indicator is recessed, and thus signals the operator that a locked kingpin jaw is secured.

Since the present device is particularly suited for vertical crane loading, the kingpin could be entered in the slot of the coupler jaw in an improper manner, being centered therein, but also being vertically displaced and not firmly supported in an engaged position. This could occur in the event that the operator fails to properly lower the kingpin sufficiently into an engaged relation with respect to the coupler jaw. Thus the coupler jaw could be in its relatively locked relation with an improper kingpin connection which might not be visible to the operator. With the present engaged kingpin detector assembly, the locking plunger cannot function or move into a locked position unless the kingpin has been vertically properly aligned within the coupler jaw and is thereby securely positioned. Only when this proper alignment and engagement takes place will the locking plunger be moved to its locking position relative to the coupler jaw and thus the indicating means properly signals only when a kingpin is properly positioned as required.

BRIEF DESCRIPTION OF THE DRAWINGS

FIG. 3 is a cross-sectional view taken substantially along the line 3—3 of FIG. 1; and FIG. 4 is a view similar to FIG. 3 showing a kingpin in engaged and locked position relative to a fifth wheel plate.

DETAILED DESCRIPTION OF THE INVENTION

Figure 1:
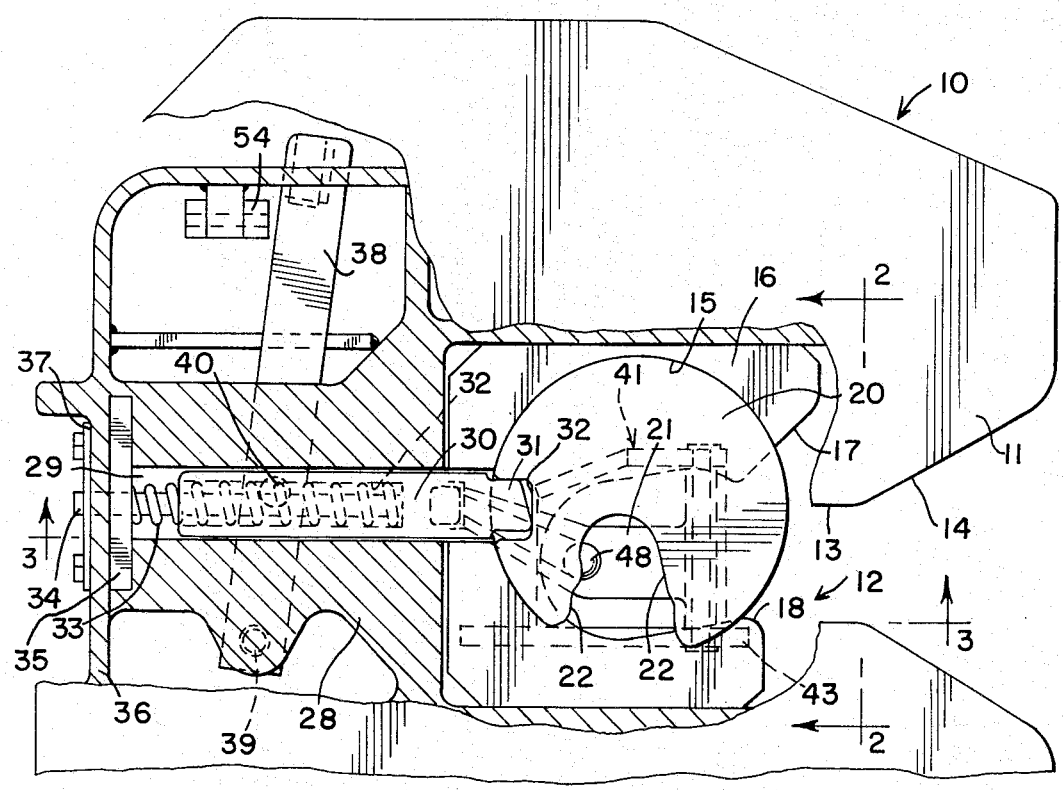
FIG. 1 is a plan view partially in section of an improved fifth wheel plate.

FIG. 1 discloses a fifth wheel assembly 10 having a top plate 11. The assembly 10 is particularly useful in trailer hitches which are carried on flat cars for trailer-on-flat-car operations. The top plate 11 comprises an open end slot 12 having spaced side walls 13 which diverge outwardly as indicated at 14. The top plate 11 also includes a cylindrical cavity 15 below which a bottom plate portion 16 is positioned. The bottom plate portion 16 is suitably connected to the underneath side of the top plate and is vertically spaced with respect thereto. The bottom plate portion 16 at its forward end is also cut out as indicated at 17–18 so as to permit the entrance of a kingpin passing through between the side walls 13 to be engaged and contained within a coupler jaw 20. The coupler jaw 20 also is provided with a gathering or open end slot 21 forming a kingpin seat. The slot 21 is formed by irregular arcuate walls 22 and 22' for receiving a conventional spool-shaped kingpin 23 to secure the same therein as set forth in the aforementioned patents. The kingpin 23 includes a cylindrical head portion 24, a central cylindrical narrow portion 25 and a lower enlarged cylindrical flange 26. In the position shown in FIG. 3 the kingpin 23 is in a locked position firmly retained on the top plate 11.

The top plate 11 includes a plurality of depending ribs 27 disposed on opposite sides of the coupler jaw 20. As indicated in FIGS. 3 and 4, the top plate also integrally includes deep or thickened portions 28 which include a longitudinally extending bore 29. The bore has retained therein for sliding movement a stop plunger 30 which is provided at one end with a nose cam portion 31. The plunger also includes a longitudinally extending bore 32 within which a coil spring 33 is positioned. The spring 33 is supported on a longitudinally extending rod 34 secured within the plunger 30 and projecting outwardly from one end thereof as best shown in FIGS. 3 and 4. The rod 34 projects through an apertured backing plate 35 which is connected to an apertured rib 36 by means of an apertured connector plate 37. The stop plunger 30 is adapted to be moved by means of a hand lever 38 pivotally connected at 39 to the deepened plate portion 28. The handle 38 is also pivotally connected by means of a pivot pin 40 to the stop plunger 30.

Figure 2:
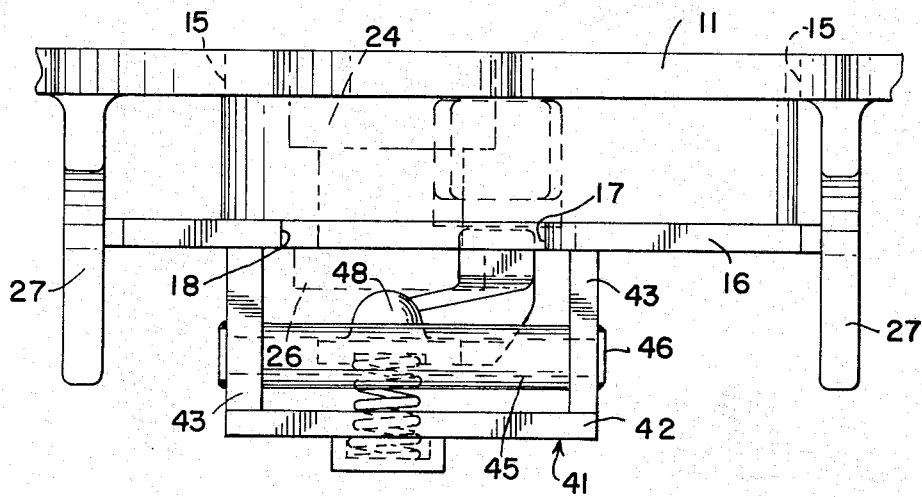
FIG. 2 is a cross-sectional view taken substantially along the line 2—2 of FIG. 1.

As best shown in FIGS. 2, 3 and 4, a kingpin detector assembly is generally designated at 41 and includes a bottom bracket plate 42 suitably connected by means of vertical plates 43 to the underneath side of the top plate 11. An arm 44 is provided at one end with a pivot sleeve 45 in turn supported by means of a hinge pin 46 suitably connected at opposite ends to the vertical plate 43. The other end of the arm 44 is provided with a stop member 47 projecting upwardly substantially normal to the arm 44. The upper surface of the arm 44 also is provided with a substantially centrally positioned projection or boss 48. The stop 47 in the position shown in FIG. 4 is adapted to engage an abutment 49 which maintains the plunger 30 in compressed relation relative to the spring 33 with the rod 34 extending outwardly a considerable distance from the apertured plate 37 to indicate that the plunger is not in locking engagement with respect to the coupler jaw 20. As also shown in FIGS. 3 and 4, the plate 16 is apertured as indicated at 50 to provide for movement upwardly of the stop 47 in the position indicated in FIG. 4. The bracket plate 42 also is provided with a spring retainer seat or socket 52 which supports a spring 51 having its upper end seated within a socket 53 provided in the lower surface of the arm 44.

THE OPERATION

In FIG. 1 the coupler jaw 20 is shown in a closed or kingpin lock position. In the open position of the jaw 20 the open end slot 21 is in longitudinal alignment with the open end slot 12 in position for engagement with a kingpin of a trailer. In the open position the handle 38 has been moved in a counter-clockwise direction from the position shown in FIG. 1 beyond a movable stop 54 and the rod 34 is disposed outwardly projecting from the plate 37 as shown in FIG. 4. The nose cam portion 31 is positioned as indicated in FIG. 4 and is in engagement with the outer peripheral surface of the coupler jaw 20. In applicant's co-pending application, Ser. No. 481,715, filed June 21, 1974, the positioning of the lever 38 and stop 54 is more explicitly described. Essentially, however, the plunger in the open position has its cam face 31 removed from the aperture 32 which has been moved out of the position shown in FIG. 1 when the said slot 21 is in alignment with the open end slot 12. During the period when the jaw is in an open position and when the kingpin 24 is not in proper position within the gathering slot 21, the stop 47 positively prevents movement of the plunger 30 to the right, that is, the position shown in FIG. 4, so that even if the jaw 20 is in the position shown in FIG. 1 without a kingpin therein, the plunger cannot move into engagement with the slot 32. This is, of course, prevented by virtue of the stop 47 and the position of the arm 44 as shown in FIG. 4.

In circus type of loading wherein the trailers are driven onto the railway flat cars movement of the kingpin and the trailer into engagement with the trailer hitch is primarily in a horizontal direction and there is less chance that the kingpin may be improperly disposed within the slot 21 with respect to proper vertical alignment. However, when the trailers are loaded onto the flat car by means of a crane, there is a movement of the kingpin both horizontally and vertically downwardly into the open end slot 12 and thereupon into the gathering slot 21. Supposing now that the kingpin is moved downwardly and horizontally into the jaw 20, the jaw is then rotated in a clockwise direction to the position indicated in FIG. 1 with the bore or socket 32 ready and in position for receiving the nose cam portion 31 of the plunger stop 30. In FIG. 4 this position is indicated and it should be noted that the kingpin 23 which is in broken line position is disposed upwardly partially projecting from the upper end of the plate 12. Thus the kingpin 23 is in improper registry from a vertical alignment standpoint and while the jaw 20 is in its closed position the kingpin is not properly captured and could accidentally be vertically displaced thereby disconnecting the connection of the trailer to the trailer hitch. Since the kingpin 23 is improperly positioned, the arm 44 and stop 47 prevent the engagement of the plunger lock or stop plunger with the socket 32 since the stop 47 is disposed in the path of movement of the abutment 49. The operator now can readily observe that the rod 34 projects outwardly of the plate 37 which immediately tells him that the kingpin is not properly disposed in the jaw 20 even though the jaw has moved to a closed position.

On the other hand, if the kingpin is properly in vertical alignment and is locked relative to the plate 16 against vertical displacement as indicated in FIG. 3, the enlarged lower cylindrical flange 26 has engaged the boss 48 and has exerted a vertical downward component which moves the stop 47 out of the path of movement of the plunger 30 as shown in FIG. 3 whereupon the plunger now is moved by means of the spring 33 into the locked position wherein the cam portion 31 is in mating engagement with the socket 32 as shown in FIG. 1. The rod 34, as shown in FIG. 3, now has been substantially retracted from the position shown in FIG. 4 and the operator now can be assured that not only is the jaw 20 in its locked position, but that the kingpin also is in proper vertical aligned relation and locked within the jaw in the position shown in FIG. 3.

Thus the present kingpin detector assembly functions to immediately signal the operator when the kingpin is properly engaged with the coupler jaw as against the improper vertical alignment which could occur as illustrated in FIG. 4.

What is claimed is:

1. A fifth wheel plate assembly for connection with the kingpin of a trailer, comprising a plate having a substantially circular opening and an entry slot communicating with said opening,
a coupler jaw supported for turning movement within said opening,
said coupler jaw having an open end slot in one position adapted to communicate with said entry slot to receive a kingpin,
said coupler jaw during rotating movement from said one position to a locked position locking said kingpin to said plate,
locking means on said coupler jaw,
a locking element movable into engagement with said locking means to releasably lock said coupler jaw against rotation in said locked position, said locking element including a spring biased plunger normally urged into engagement with said locking element, said plunger having indicator means positionable to indicate locked and unlocked positions of said plunger, the improvement comprising;
an engaged kingpin detector assembly connected to and positioned below said plate,
said assembly including an arm,
a stop on said arm,
said arm being normally biased into engagement with said locking element whereby said stop prevents movement of said locking element into engagement with said locking means, and means on said arm engageable by the kingpin in the closed position only when said kingpin is in a proper vertical position relative to said arm whereby a downward force of the kingpin on said arm moves the same and said stop out of engagement with the locking element permitting said locking element to engage said locking means.

2. The invention in accordance with claim 1;
said arm being hingedly connected to said plate for movement about a horizontal axis.

3. The invention in accordance with claim 1;
including a bracket connected to the underneath side of said plate,
horizontal pivot means connecting one end of said arm for hinging movement about a horizontal axis, and spring means urging said arm upwardly whereby said stop is positioned in the path of travel of said locking element.

4. The invention in accordance with claim 3;
including a projection on an upper surface of said arm engaged by the lower end of a kingpin moving downwardly into said open end slot whereby said arm is depressed by the kingpin and said stop is displaced from the path of movement of said locking pin.

5. The invention in accordance with claim 4;
said arm being disposed below and in alignment with said open end slot.

* * * * *